Dec. 30, 1930.  W. C. WARD  1,787,293
SAFETY AIRCRAFT
Filed July 2, 1928
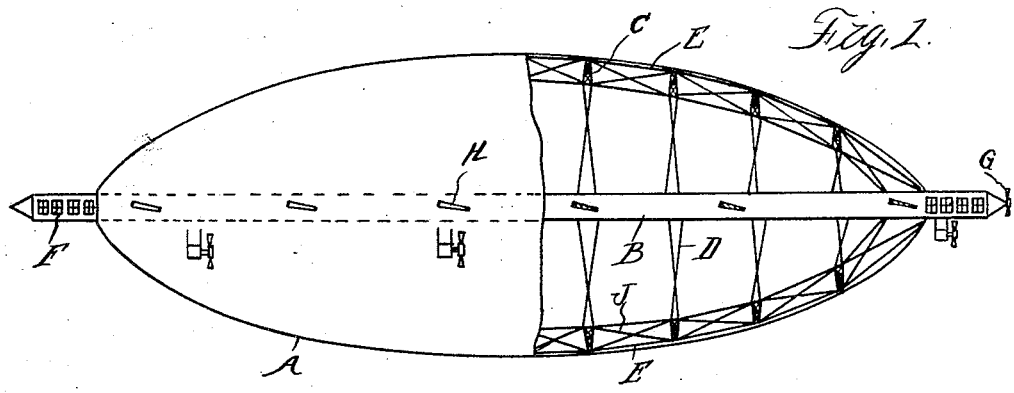
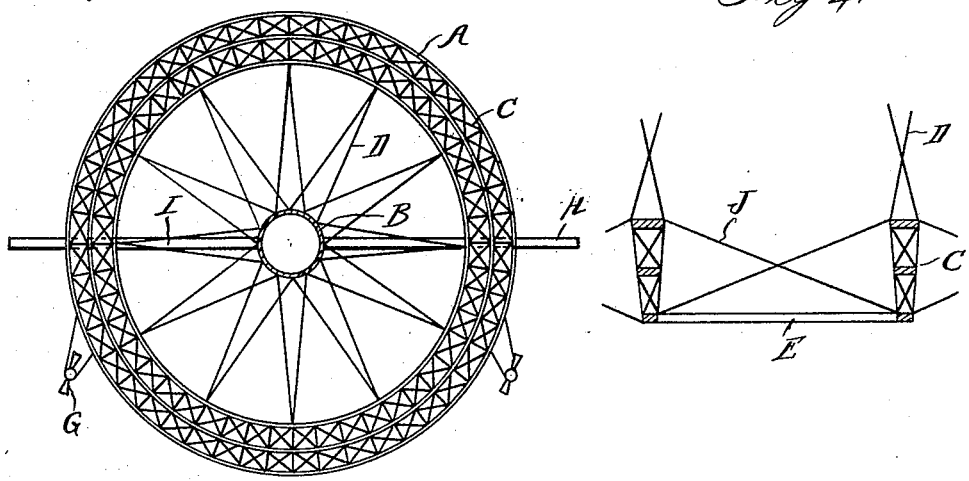
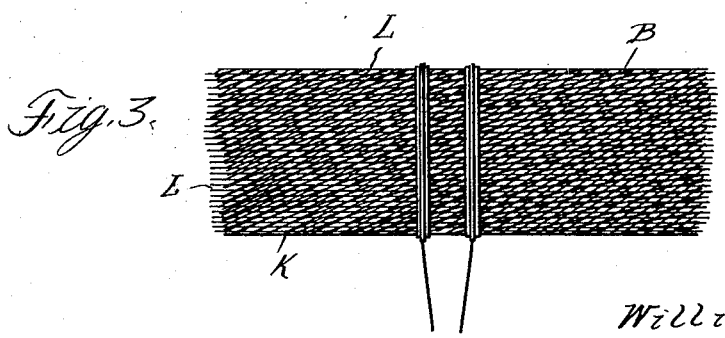
Inventor
Willis C. Ward
Attorneys Patented Dec. 30, 1930

1,787,293

UNITED STATES PATENT OFFICE

WILLIS C. WARD, OF ORCHARD LAKE, MICHIGAN

SAFETY AIRCRAFT

Application filed July 2, 1928. Serial No. 289,953.

The invention relates to aircraft and more particularly to the lighter than air types.

It is the object of the invention to provide greater safety for the passengers and the crew and to this end the invention consists in the construction as hereinafter set forth.

In the drawing:

Figure 1 is a longitudinal section through the machine partly in elevation.

Figure 2 is a cross section thereof.

Figure 3 is an elevation showing the construction of a detail.

Figure 4 is a plan view of one of the brace frames.

In the lighter than air type of machines it is usual to carry the crew and passengers in a gondola suspended from the gas inflated shell. With my improved construction I substitute for this gondola compartments arranged axially of the shell and also provide a bracing system which greatly strengthens the shell.

In detail A is the shell. B is a tubular skeleton frame extending axially the entire length of the shell and projecting beyond the same at its forward and rear ends. C are annular rib frames arranged in different positions along the shell A and connected by the spokes D with the tubular member B. Between the adjacent members C there is arranged a cross bracing frame-work E which ties all of these frames together. A portion of the tubular member B which projects beyond the shell A at both forward and rear ends may be used as a compartment for the passengers and crew. Thus as shown it is provided with a series of windows F for observation and the compartment at one end may house a portion of the motors and other mechanism (not shown). The propellers or tractors G may be arranged either in axial alignment with the tube B or at the side thereof or outside of the gas shell. H are wing members which project laterally from the shell F and are braced by the inwardly extending frame member I. As shown in Figure 4 the annular frames C are further connected with each other by cables J which together with the intermediate brace frames E, K impart rigidity to the structure. The tubular member B may be lightened in construction by forming it in skeleton of crossing spiral and longitudinally extending rod or tube members K and L.

With the construction described there is no part projecting downward beyond the shell to be torn off and the passengers and crew remain in comparative safety in the compartments at opposite ends of the shell. Furthermore, in case of a crash these compartments are the last to come in contact with the ground and are thoroughly cushioned by the annular frame C and connecting spokes D.

While I have described my invention as applicable to the lighter than air type of machines it is equally applicable to machines which are to some extent heavier than air. This is because the wings which project from the sides of the gas shell will assist in the lifting of the machine and in maintaining flight.

What I claim as my invention is:

1. A safety aircraft comprising a gas inflated shell and a compartment extending axially of said shell and projecting beyond the end of the same.

2. A safety aircraft comprising a gas inflated shell, a tubular member extending axially of said shell and beyond the same to provide a compartment at the end thereof for the passengers and crew, annular frames which brace said shell and spokes connecting said tubular member with said annular frames.

3. A safety aircraft comprising a gas inflated shell, a tubular member extending axially of said shell and beyond the same to provide compartments for passenger and crew, annular frames for bracing the shell having spoke connections with said tubular member, wings projecting laterally from said shell and brace frames for said wings within the shell.

4. A safety aircraft comprising a gas inflated shell, a tubular member extending axially of said shell and projecting beyond the same at the forward and rear ends thereof, said projecting portions providing compartments for the passengers and crew, annular frames for bracing said inflated shell, spokes connecting said annular frames with said tubular member, wings projecting laterally from said inflated shell and brace connections for said wings within the shell.

In testimony whereof I affix my signature.

WILLIS C. WARD.